(12) United States Patent
Hing

(10) Patent No.: US 8,176,318 B2
(45) Date of Patent: May 8, 2012

(54) METHOD AND SYSTEM FOR PROVIDING A CUSTOMIZED NETWORK

(75) Inventor: Eileen Chu Hing, Philadelphia, PA (US)

(73) Assignee: ZIOS Corporation, Philadelphia, PA (US)

( * ) Notice: Subject to any disclaimer, the term of this patent is extended or adjusted under 35 U.S.C. 154(b) by 1330 days.

(21) Appl. No.: 10/553,715

(22) PCT Filed: Apr. 16, 2004

(86) PCT No.: PCT/US2004/011878
§ 371 (c)(1),
(2), (4) Date: Apr. 12, 2007

(87) PCT Pub. No.: WO2004/095182
PCT Pub. Date: Nov. 4, 2004

(65) Prior Publication Data
US 2007/0300236 A1 Dec. 27, 2007

Related U.S. Application Data

(60) Provisional application No. 60/463,201, filed on Apr. 16, 2003, provisional application No. 60/468,681, filed on May 7, 2003.

(51) Int. Cl.
*H04L 29/06* (2006.01)

(52) U.S. Cl. .................................................... 713/165
(58) Field of Classification Search .................. 713/165
See application file for complete search history.

(56) References Cited

U.S. PATENT DOCUMENTS

| 6,237,096 | B1 | 5/2001 | Bisbee et al. | |
| 6,549,944 | B1* | 4/2003 | Weinberg et al. | 709/224 |
| 2001/0050681 | A1* | 12/2001 | Keys et al. | 345/418 |
| 2006/0240396 | A1* | 10/2006 | Foo et al. | 434/350 |
| 2008/0294726 | A1* | 11/2008 | Sidman | 709/206 |

OTHER PUBLICATIONS

WO 03/015055, Jul. 30, 2002, Foo.*

* cited by examiner

*Primary Examiner* — Christopher Brown
(74) *Attorney, Agent, or Firm* — Stamoulis & Weinblatt LLC

(57) ABSTRACT

The present invention comprises a method, system, and computer-readable medium for providing a secure computer network for the real time transfer of data. The data is grouped and stored as per user preferences. The data being transmitted is encrypted, decrypted, and validated by the system (assuming user identifications/passwords are verified). The present invention enables the use of customized forms for the data; these forms are driven by customizable scripts. It offers security and specialized messaging.

15 Claims, 5 Drawing Sheets

METHOD AND SYSTEM FOR PROVIDING A CUSTOMIZED NETWORK

CROSS REFERENCE TO RELATED APPLICATIONS

This application is a national stage continuation patent application of International Application No. PCT/US2004/011878, filed Apr. 16, 2004 which was published in English pursuant to Article 21(2) of the Patent Cooperation Treaty, and which claims the benefit of U.S. Provisional Patent Application 60/463,201, filed Apr. 16, 2003 and U.S. Provisional Patent Application 60/468,681, filed May 7, 2003, all of which are expressly incorporated by reference in their entireties.

FIELD OF THE INVENTION

The present invention relates to a method and system for providing a data communications network. More particularly, the present invention is directed to a method, system, and computer-readable medium to provide a computerized, communications network that allows for universal electronic data exchange, including, without limitation, customized data forms, validation, encryption, transmission, and decryption of data, time stamping, and real time monitoring of the status of data transmissions.

BACKGROUND OF THE INVENTION

The use of communications networks to collect and transfer information using the Internet is widespread. These networks are generally accessed through use of desktop and laptop computers (PCs) and also through wireless networks, such as through personal digital assistant (PDA) devices and cellular telephones. Nevertheless, many of these available networks do not allow for secure transfer of data (i.e., encryption), flexibility in how the data is grouped and shared, and/or a way of connecting disparate and legacy databases and systems. Furthermore, many of these networks require batch processes (that is, replication) and/or wired connections for transferring data from a PDA or other remote terminal to the main computer network, e.g., hotsyncing.

Methods of data exchange used by businesses involve faxing and electronic data transmission, such as through e-mail, Electronic Data Interchange ("EDI"), etc.; these methods have various limitations. EDI uses proprietary networks that are limited such that only specific transaction data can be exchanged. In addition, EDI can be prohibitively expensive for individuals and small companies and a difficult system to implement.

The development of the long awaited Web Services XML-based technologies is not complete and the technology lacks adequate security. Specifically, some necessary elements of the Web services architecture are not yet in place. In addition, programming using XML constructs is often complex and more difficult than other programming languages.

In addition, conventional data exchange frameworks generally use complex architecture, requiring proprietary networks. This complexity provides less flexibility in grouping and manipulating data and makes it difficult for users to customize their network.

Furthermore, it can sometimes be cost prohibitive and difficult to implement data exchange methods using proprietary architecture.

Thus, there is a need for a facile method and system for providing a secure computer network in which data can be grouped, stored, and transferred as per user preferences

SUMMARY OF THE INVENTION

The present invention comprises a method, system, and computer-readable medium for providing a secure computer network for the real time transfer of data. The data is grouped and stored as per user preferences. The data being transmitted is encrypted, decrypted, and validated by the system (assuming user identifications/passwords are verified). The present invention enables the use of customized forms for the data; these forms are driven by customizable scripts. It offers security and specialized messaging.

It is to be understood that the foregoing general description and the following detailed description are exemplary, but not restrictive of the invention.

BRIEF DESCRIPTION OF THE DRAWINGS

The present invention is best understood from the following detailed description when read in connection with the accompanying drawings. It is emphasized that, according to common practice, the various features of the drawings are not to scale; rather, the dimensions of the various features are arbitrarily expanded or reduced for clarity. Included in the drawings are the following figures.

DETAILED DESCRIPTION OF THE INVENTION

Figure 1:
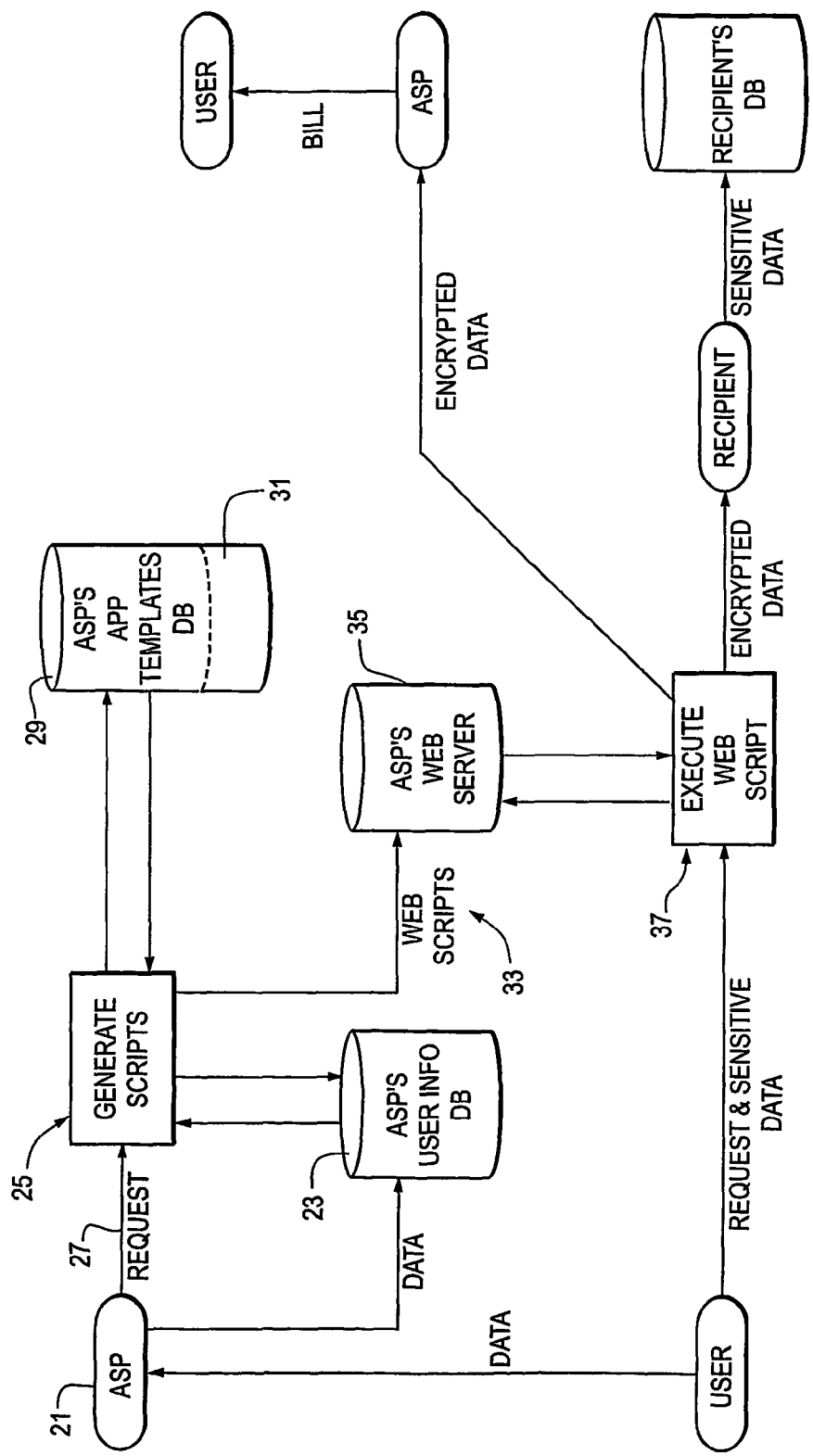
FIGS. 1-5 are schematics showing the steps of the method and system, and any corresponding computer readable medium, of the present invention.

The present invention comprises a method, system, and computer-readable medium for collecting, storing, and transmitting data for any associated application, such as for medical or legal billing information, and/or providing consumers with goods and services, such as food items, consumer electronics, etc.

Referring first generally to various aspects of the invention, in one embodiment, a customized application/software enhancement resides on top of an existing legacy system, allowing businesses to exchange data within internal corporate departments and between outside business partners. An application service provider ("ASP") is preferably associated with various operational aspects of the inventive system through a computer network. The data and program scripts are, in one version of the invention, stored at the ASP to minimize the hardware requirements for each user. The system is configured so that it can be continually updated and upgraded at the ASP level with little or no need to update local users' network hardware (servers), local hardware (PDAs or PCs), or software.

The ASP is simultaneously a data/information service, web developer, application or software provider, hosting service, data interface, and information technology support group.

Each user may have its own portal in the network for gathering, grouping, executing, storing, encrypting, transmitting, receiving, validating, and/or decrypting data. For example, a merchant may have a portal with data and fields customized to that merchant's business. Specifically, a food vendor can have a portal customized to its menu and pricing such that users can order food pursuant to the network. The user enters information into the food vendor's portal through the customized form and the data is encrypted for transmission to the food vendor. The customized form may have popup menus providing options for the user to choose, e.g., main course, side dish, dessert, etc. The food vendor decrypts and validates the data, e.g., the food choices or credit card information, to process the order. Meanwhile, the system copies the data being transmitted for validation and backup and maintains a database with the status of the data transmission.

The network generates scripts via agents, such as zotbots, which the user utilizes for entry, storing, and/or storage of data. These scripts are stored by the ASP and are accessible to the user. The system receives the data from the user and stores it into the system database and optionally in the user's database.

The computer network may be accessed through a land-based line, using a modem for DSL, phone, or cable connections, through a traditional PC, or a wireless connection, such as through a PDA or cellular telephone, using any suitable wireless technology that allows for secure transmission of data (e.g., WiFi). Transmission data is stored in the ASP's database such that a bill can be generated for the transaction. That bill can be processed automatically by an agent or zotbot. The bill from the ASP can be based on a percentage of the sale price of a transaction carried out or can be a flat fee per transaction or per transmission. Alternatively, the user can pay a fee accordingly to a fixed, predetermined period, for example, annually, semiannually, quarterly, monthly, weekly, daily, or hourly that permits the user to have an unlimited or predetermined number of transactions during that billing period.

The system/network tracks the transmission of data (whether encrypted or unencrypted) and maintains a database with the status of each data transmission. Thus, it can provide reports on data being entered, grouped, encrypted, validated, decrypted, transmitted, etc.

Existing users or new users may send or receive data, possibly in response to a communication generated by the system, such as an advertisement sent via e-mail (e.g., a special offer by a merchant-user). Portions of the communication may be identical for all users of the system or customized based on a return user's characteristics. Each user's characteristics are maintained in the system in a historical database containing a record for each user. The historical database of user characteristics can also be used to validate data transmitted to and from that user.

Referring now generally to how certain exemplary embodiments are operated, the user enters information into a dynamically generated web page or form that is displayed. The customized form enables a dynamic web page for users. The format can be utilized by PCs, handheld computers/PDAs, or any device with web browsing capability. In one embodiment, the information for each form (page) is stored within a script which is an agent or so-called zotbot.

The data is then validated to ensure that the form is completed correctly and the correct type of data is entered. Validation ensures that the data being transmitted is in accord with the system's rules for each data field maintained in a system database (e.g., the system checks for the proper number of digits of a credit card or phone number and checks that only numbers, not letters, have been entered). This helps to ensure security and filters out junk data and malicious snippets of code.

After the data is validated, it is encrypted using an algorithm, such as the Blowfish encryption algorithm or any other suitable, compatible encryption method, and transmitted to the recipient. To augment security, the encryption algorithm can be changed periodically or randomly. The data is then e-mailed and decrypted so the recipient can process and store the data in a database. The e-mailing and encryption can be controlled by modules that use open source code or proprietary code.

Once the data is decrypted, the status of the data is generated and stored on the recipient's web server allowing one or more users access to the status information. In addition, the system ASP, through its own mail server, monitors the transmission of data and stores data being transmitted for backup and billing purposes. In particular, the ASP can use the stored data to determine the history of the data transmission, i.e., any malfunctions in how the system transmits the data, to correct the specific transmission and/or correct any system-wide or recurring problems in transmission.

In addition, the stored data enables the ASP to bill users for the transmission of data, based on transactions consummated, or a combination of the two depending on the user's network activities. As described above, the system is capable of recording a trail of time stamps in each step of the process.

As one example of suitable applications which implement the invention, the invention may be used by a medical professional, allowing the professional to enter patient (demographic, diagnosis, and treatment) information in a customized form (i.e., with a customized grouping), and transmit the information to a hospital's and/or insurance company's database in an encrypted form. The data can then be decrypted by the recipient and validated for compliance with the requirements (customizable by the system) for data type and grouping or, for example, insurance company and other medical payor requirements for payment of claims. Meanwhile, the system tracks the transmission of data and maintains a database having the status of each event of the data transmission. Additionally, the system stores the data being transmitted for validation and backup purposes.

The method and system of the present invention are configured to provide a secure means of transmitting sensitive patient data. The system can be adapted to be compliant with any legal requirements for submission of data, such as HIPAA compliance, tax filing for the IRS, etc.

Referring more specifically to FIG. 1, an application service provider or other web services host 21 has extracted from a main database by any suitable means sufficient user information for the corresponding application. This user information has been loaded into a suitable, searchable or hierarchical database 23 for use by the system as described subsequently. The information in database 23 is preferably copied from or otherwise obtained from a client's or user's main database, but an independently derived database 23 is likewise suitable. Alternately, in another suitable embodiment, the data structure could be an XML construct where it would always access a client's main database of associated information.

Suitable programming represented by block 25 responds to user requests 27 and, through various agents or similar subroutines, accesses and arranges certain data from database 23 for further processing by the system. Programming 25 is any suitable messaging and collaboration system or database management system for multi-user access to databases and corresponding manipulation of the data therein. Programming 25 preferably makes use of data templates 29, which templates are used by instruction sets or "agents" of programming 25, along with data from database 23, to process the request or requests 27 being made of system 19.

The interactions orchestrated by the agents or instruction sets of programming 25, templates 29, and associated data 23 are both generalized and optimized for any number of different types of requests 27 by means of a carefully crafted data structure 31. Data structure 31 is contained in templates 29. More particularly, data structure 31 has been organized and is populated by programming 25 so that it can be used very efficiently in the generation of web scripts 33. By carefully choosing, organizing, and orchestrating the population of data structure 31, a larger number of web scripts 33 can be generated, corresponding to a larger number of requests 27, whether such requests are part of a single application of system 19 or a cross multiple applications of such system 19.

One example of a suitable data structure in Perl is set out below:

```
$username="5004";
my %usernamecode=(5004 => "Smith,John", 5010 => "Kreiger,Maurice",
5012 =>
"Stein,            Rebecca", 5111 => "Willard,Tim");
my $usernamereference=\%usernamecode;
my $mattersreference={CLIENT101 =>   ["108200 Davis v. Yoder",
                                      "207111 Beaver v. Tom",
                                      "001800 Smith v. Berger"],
                      CLIENT102 =>   ["207301 Son v. Tim",
                                      "107782 Springton v.
                                      McDermick"]
                     };
```

A further code snippet for orchestrating the data into web scripts is set out below:

```
    print $q->popup_menu(-name => "username",
                         -values => $usernamereference,
                         -default => $username
                        );
    print $q->popup_menu(-name => "reference",
                         -values => $mattersreference->{$q-
    >param("clientname")},
                         -default => $mattersreference->{$q-
    >param("clientname")}->[0]
                        );
```

Having manipulated data 23 in response to request 27, programming 25 generates web scripts by suitable use of templates 29 and data structure 31, such web scripts corresponding to original request 27. This can be done in batch mode at a specified time, on demand as needed, event triggered, or at periodic intervals. The web scripts 33 preferably reside or are sent to the ASP's web server, as shown by step 35 of FIG. 1. Depending on the nature of request 27, and the nature of the interaction of the ASP in such request, all or a portion of web scripts generated at step 35.

Programming 25 thus generates instruction sets which are adaptive in the sense that different system-level requests arrange data and corresponding instructions differently and dynamically, in response to such requests. These dynamic and adaptive instruction sets which are generated are referred to as "bots" or "zotbots."

Figure 2:
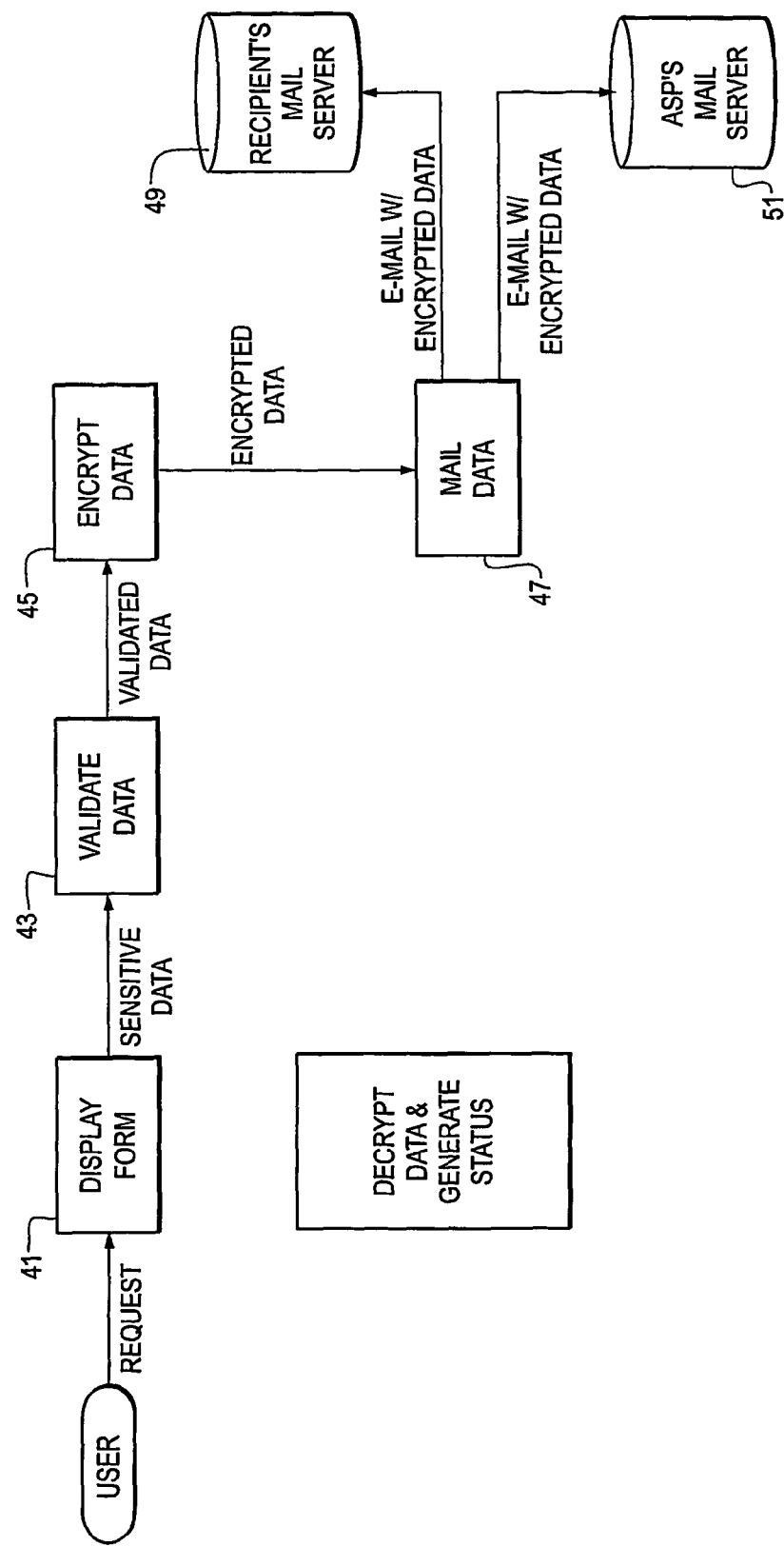

FIG. 2 further details the execution in function block 37 (FIG. 1) of the above-mentioned web scripts 33. Thus, in the case of a timekeeping program for attorneys, a patient diagnostic program for physicians, a food reallocation program for restaurant purveyors, or any of the other myriad user applications contemplated herein, execution of web scripts 37 involves further interactions and data transmissions between a user desiring to use system 19 and the associated data which populates not only the web scripts generated, but also the corresponding databases which may be used in response to user requests. Referring more particularly to FIG. 2, the execution of web script in step 37, in one embodiment, results in a form displayed on a user-accessible device, preferably under SSL or some secure channel, such as a wireless handheld device (step 41). For those applications in which the user inputs data into such form, the format or contents of such data undergo various encryption and/or manipulation steps depending on the protocols involved. Thereafter, depending on the application, data is suitably validated in step 43, encrypted (step 45), and e-mailed within SSL, sent encrypted via SMS, sent directly unencrypted within a secure VPN tunnel, or sent unencrypted via secure SMS (step 47) to the desired recipient of such inputted data, be it a billing processor, patient record keeper, food purveyor, etc. for integration into a database, and the like.

An important aspect of the execution of web scripts which has thus far been described is its efficient handling of sensitive data. More particularly, encryption algorithms are chosen which are readily adaptable to a variety of different applications or sub-applications of system 19. In one preferred embodiment, an open source architecture is the basis for encryption and decryption of sensitive data traveling on system 19 in response to requests or execution of web scripts. Of course, it will be appreciated that any number of security protocols may be used if needed in executing web scripts according to the present invention, including proprietary architectures.

The data inputted by a user is not only sent in encrypted form for further processing to its intended recipient (step 49), but is optionally sent to the mail server of the host or ASP, as shown in step 51. The participation of the host or ASP in data handling, such as receiving inputted data by e-mail, enhances the flexibility and functionality of the available applications for system 19. Thus, for example, the ASP can host multi-user interactive applications on a pay-as-you-go basis. Otherwise stated, the user of the application can be billed for use of system 19 based on the number of transactions it has engaged in, and such transactions can be "tracked" as they are received by the ASP's mail server in step 51 referenced above.

System 19 can thus be configured such that a heavy user of system 19 shoulders a correspondingly heavier financial burden and, conversely, an occasional user would be responsible for a correspondingly smaller burden associated with the conveniences and other benefits of using system 19. From the ASP point of view, programmers and application developers may expend time and effort developing or customizing system 19 to one user or a class of users and the cost of such development efforts can be returned to the ASP over time as a function of the use of such functionality by the user or users. This flexibility, in turn, makes pervasive e-commerce easier for ASPs and customers, as a cost structure associated with such pervasive e-commerce can be created and tracked by the ASP's mail server receiving data in step 51 of FIG. 2.

Figure 4:
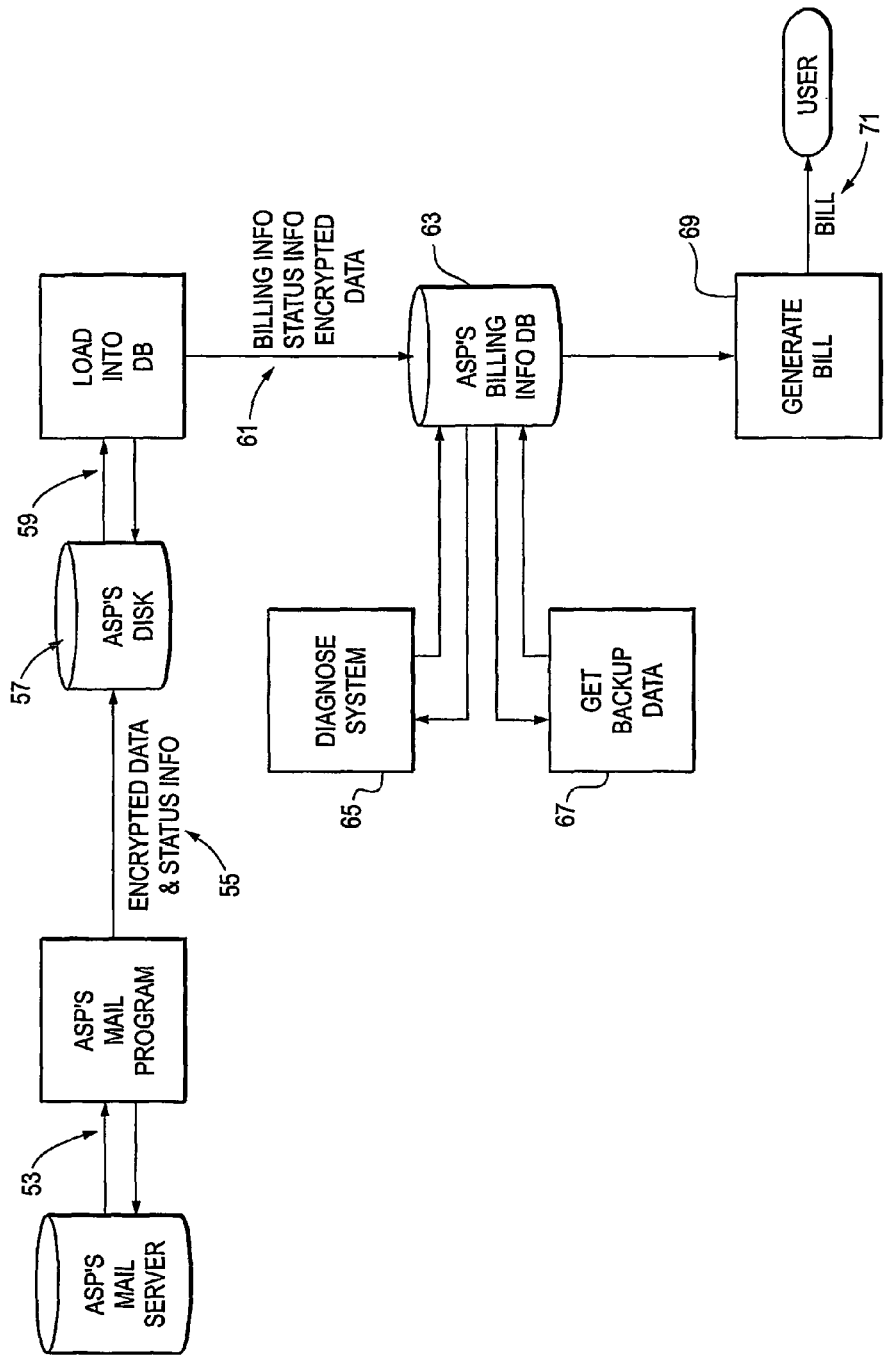

One suitable system and associated method for per-transaction billing is shown in FIG. 4. Data received on the ASP's mail server in step 51 of FIG. 2 is manipulated by the ASP's messaging program in step 53 of FIG. 4, using suitable security measures, such as encrypting data, and such data from the messaging program is suitably stored on the ASP's disk 57. The data from disk 57 is suitably manipulated, filtered, or otherwise processed by steps 59 and 61 such that a billing info database 63 is generated. Database 63, in turn, is subject to diagnostics routines 65, back up routines 67, and bill generation routines 69 appropriate for the financial nature of the information contained in billing info database 63. Suitable programming includes whatever formulae, algorithms, or methodologies used by the ASP to ascribe a financial value to the use of its system, so that a corresponding bill can be generated in step 71, and communicated suitably to the user of such system 19. In one embodiment, the ASP's messaging and collaboration system uses an agent to automatically store the encrypted data and status information to disk and load the billing, status, and encrypted data to the ASP's billing info database, with the appropriate billing flags checked. The ASP can then bill on a regular (monthly) basis.

Figure 3:
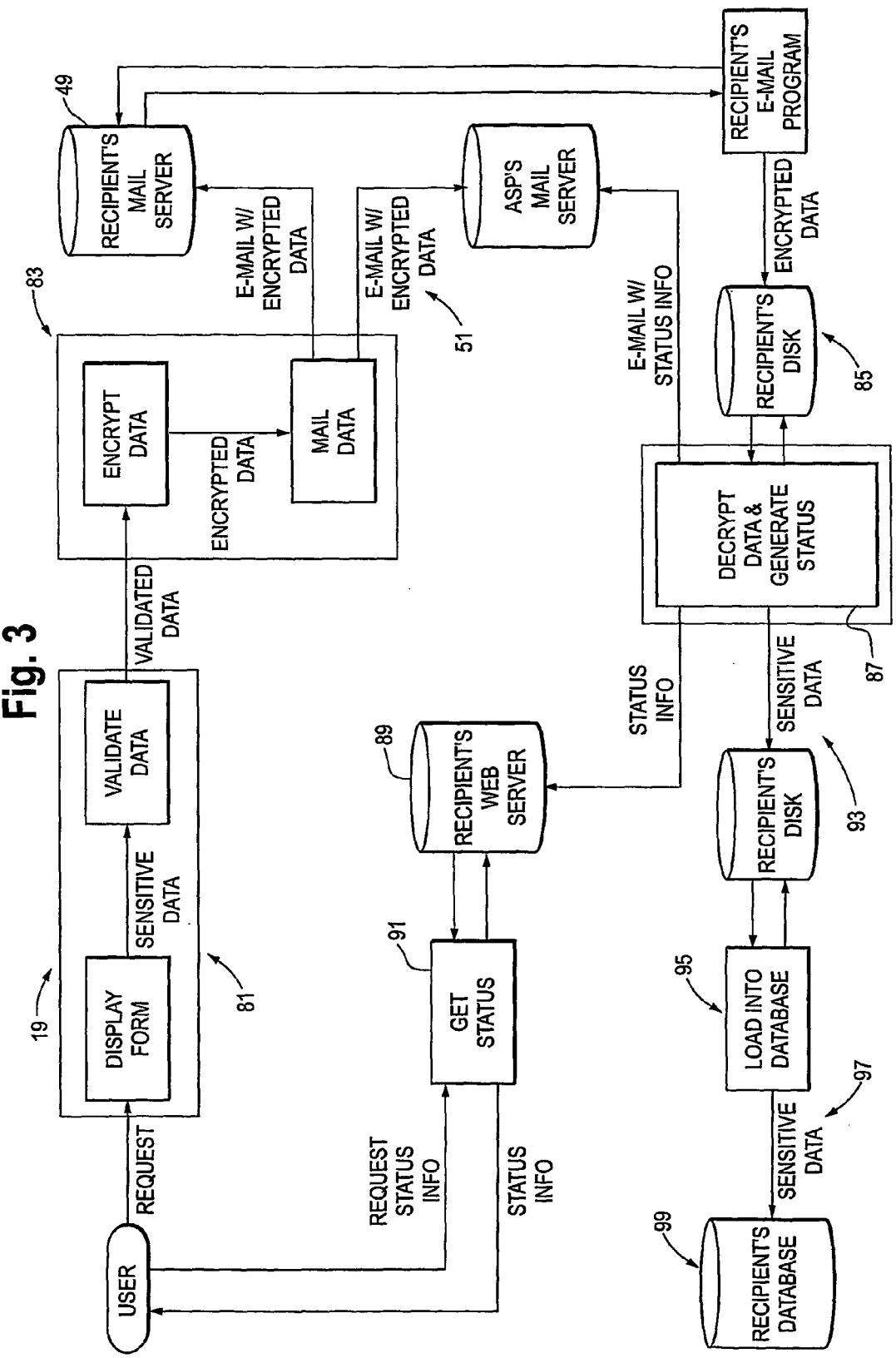

Referring now to FIG. 3, it is appreciated that system 19 of the present invention is preferably a form of "middleware" meaning it creates an interactive fabric or wrapper for processing data which is accessed or inputted from a distributed location or locations. Although such data processing ultimately must interact with central databases, the use of such middleware, fabric, or wrapper reduces the need to access central or other main databases during data processing and thus improves efficiency, speed, system performance, and produces all the other advantages related to simpler communications.

By using the middleware of system 19, the agents or "bots" for generating scripts discussed previously are created so as to contain or have access to all pertinent information without needing access to a main database. Such architecture limits data corruption, avoids data collisions, deadlocks, the need for syncing over wireless or by cable, enhancing performance and security. The middleware likewise is designed to coexist with a system's current processes. Preferably, the system 19 is accomplished on an existing server and in such a way that wireless functionality is added to the system without needing customization to existing applications of the system. As seen in FIG. 3, most of the information processing discussed previously occurs in the layer separate from the main processing systems and databases associated with application information. Thus, execution of web scripts discussed in reference to FIG. 2 occurs in a middleware module 81 which is preferably separate from main database 99. Communication of the inputted data from module 81 is accomplished by suitable messaging applications, such as electronic mail communications in system module 83, which module 83 sends electronic mail containing the validated data both to recipient mail server and to ASP mail server, as described previously with request to steps 49 and 51 of FIG. 2. The middleware modules are structured so that, if desired, data inputted therein by the user is checked for integrity, conformance, validity, etc. before loading on or transmission to the main database of the client's system.

Once encrypted data has been suitably received by the intended recipient, it is independently processed from recipient's disk 85, that is, independently of the "wrapper" which otherwise executes web scripts and otherwise processes data in response to user requests. The recipient decrypts the data and generates suitable status indicators in step 87. When executing programming referred to as Agent Decrypt, the programming decrypts the information, which is displayed on the web browser's screen, and creates a status information file (step 87) on the web server, preferably on the web server where Agent Decrypt resides. This status file is preferably updated with current status information as appropriate agents execute corresponding tasks within the middleware layer or as the system otherwise dictates. Thus, in a food purveyor application, for example, the customer places an order. The order information is processed at the middleware layer by modules 81 and 83. The ASP has suitable programming to decrypt the order information, trigger the creation of an order status file (step 87), and send email confirmation to the requestor or customer. (step 89). The order information is validated for its integrity and any payment processing is likewise accomplished by suitable programming and loaded into the database. The status is periodically updated at various points during the processing of the food order by means of agents, and means are provided, through web links or otherwise, for the customer to obtain reasonably current status information (step 97).

Depending on the particular application or user request, the data is processed such that the status information file is generated on the web server where the agent resides (in step 89), where it is either communicated by e-mail or accessed by user interactively in status or other requests 91. The decrypted data is saved as a file onto the recipient's disk 85 and is likewise suitably transferred and loaded onto the main database as shown in step 93, 95, and 97.

Throughout the operation of system 19, secure messaging and related encryption and decryption protocols are used, as required by the particular application.

It will be appreciated that the programming 25 for generating web scripts may be accomplished in any suitable language. Preferably, programming 25 is accomplished in Perl and the execution of such Perl scripts generates corresponding HTML code. Data security is likewise provided by any suitable means, including SSL and VPN. Although Perl or other web script programming is preferable, still other programming languages and protocols are likewise suitable and encompassed within the present invention, such as Java, XML, and the like.

The following examples further demonstrate operation of the invention.

Example 1

In one exemplary embodiment of the invention, the network/ASP of the present invention is used in connection with the health care field. Specifically, a physician examining a patient uses a PDA or other portable, wireless device to enter information about a patient being examined and/or treated. The physician's portal into the network provides a customized data form with fields for receiving information on the patient, such as demographic information, medical history, medications being taken, allergies, summary of the diagnosis made by the physician, treatment resulting from the diagnosis, etc.

In real time, the physician can transmit the data to the hospital or practice office database by encrypting the data and transmitting the encrypted data. The recipient (hospital or practice office) database via an agent or zotbot decrypts the data and then validates the data against its own database. The hospital or practice database contains information on the patient, diagnosis, treatment, and any other pertinent information on the patient or medical treatment. The data entered by the physician can be validated to make sure it is consistent with the data maintained in the hospital or practice database. Alternatively or additionally, the data can validated upon entry by the physician.

The network monitors the data transmission and validation and can notify the physician in real time if the data being entered is inappropriate (or appears to be an error). In addition, the network allows for the transmission of a similar message from the hospital or practice database to the physician if one of their databases generates information that the treating physician should have, e.g., insurance no longer valid. Meanwhile, the network stores all of the data transmitted and monitors the status of the transmission. The network can provide status reports to users regarding the data being transmitted and the transmission process. In addition, the network bills the user(s) based on the predetermined cost scheme for use of the network.

The network can be used to support other members of the health care field as well. For example, psychiatrists can use it to gather patient information during a therapy session. Also, physical therapists can use the network to chart the rehabilitation progress of patients and compare to previous sessions.

Example 2

In another exemplary embodiment of the invention, the network/ASP of the present invention is used in connection with the food service industry. Specifically, a restaurant (or food delivery and/or take out store) maintains a portal in the network containing its daily menu and an ordering form with prices. A user of the network can access the restaurant's portal or web site and place an order by entering and transmitting the data (optionally, encrypting the data, such as if credit card information is provided). The restaurant's form may have line items to choose from in a list, replicating a conventional restaurant menu, or popup menus. The form has the items that the restaurant offers during a specific period (e.g., daily or weekly specials). These line items or popup menus can be changed by agents or zotbots, for example, if a restaurant changes its menu or runs out of a particular item.

Another example of a data field for the restaurant's form is the site for pickup of food. The options can be from a list (or popup menu) of available pickup locations. The user would generally pick the most convenient location; however, if a location reaches capacity, an agent or zotbot can remove that location from the list so that it is no longer available for choosing.

The recipient-restaurant validates the order data (ensuring that, for example, the customer name contains only letters) and processes the order or, if the data in the order is inappropriate, notifies the user in real time by transmitting a message through the network. Possibly, the restaurant encrypts and transmits data regarding the final price, the time the food will be ready, etc. back to the user by the same process.

During the order process, the network receives and stores the transmitted data for backup and verification purposes. This enables the network to bill the users for the transmission of data or based on the transaction consummated and serves as a backup copy for the data being transmitted.

E-mail agents or zotbots can process the messages, validate users, decrypt, validate data, and load into the database. Agents or zotbots can also process bills.

Example 3

In yet another exemplary embodiment of the present invention, the ASP/network is used in connection with a law firm billing system. The network creates a customized portal for each user having fields containing popup menus displaying permissible options for each field. The fields may be user identification, work type, time spent on a task, task description, client and matter names and numbers, billing rate, etc.

An attorney can enter time spent on matters and descriptions of those matters from a PDA or other remote and/or wireless source. This can be entered at the time of performing the work to be transmitted to, possibly wirelessly, the law firm's central billing program that generates bills for clients. The data from a user is encrypted (of special importance for legal services rendered based on the need for client confidentiality, i.e., the attorney-client privilege), decrypted at the law firm's central location, and validated.

Figure 5:
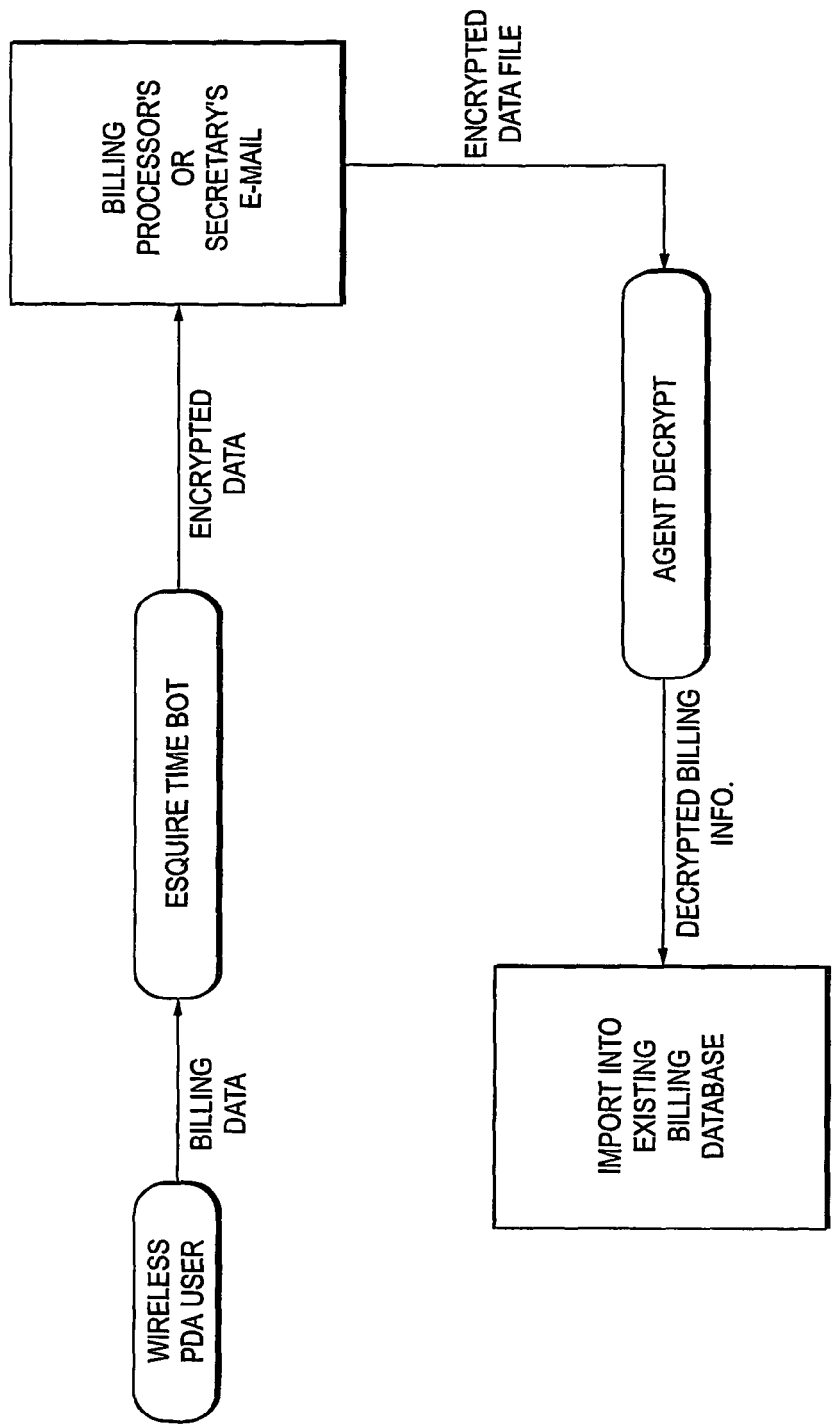

As shown in FIG. 5, with regard to the EsquireTimeBot™ application, legal billing data (e.g., client, matter, description, time spent, etc.) is entered by a user through a wireless PDA. This data is transmitted through the EsquireTimeBot (agent) that encrypts and, optionally, validates the data. The data is then transmitted to the billing processor for the law firm or secretary of the user, possibly through e-mail. The data is then decrypted by the AgentDecrypt (agent) and optionally, validated. The decrypted data is then transmitted to the billing database for importation and further processing (e.g., generating bills). In an alternative embodiment, the billing data can proceed from the user to the billing database (without being transmitted to the billing processor or user's secretary) via agents (bots).

In addition to use with a billing program, the network of the present invention can also be used by attorneys engaging new clients. It allows for a user to enter a prospective client name remotely via PDA and that client name can be transmitted to the law firm's database in real time. The prospective new client name can be compared to existing clients, former clients, or adverse parties to matters the firm is handling to determine if the firm can represent that prospective new client or if there would be a conflict of interest.

In view of the foregoing description, it will be appreciated that one aspect or advantage of the present invention comprises a high tech and cost efficient model for conducting business via a computer network, such as through the Internet. As a further advantage, the method and system implement pervasive computing and do not need to be limited geographically or technologically in their reach; suppliers and users can be geographically spread out, use different internal computing systems, and still be linked up by the system of the present invention. In addition, the present invention can provide advertising to the users of the network who provide goods or services or exchange data.

As a still further advantage, the present invention provides an efficient, time saving network for engaging in commerce (e.g., purchasing goods and/or services) or otherwise exchanging data between users in real time. The present invention acts as a universal data interface that can connect different types of systems, such as a data input method into an existing legacy system.

In a related advantage, the method and system allow for the incorporation of modern, developing wireless technologies into legacy systems; in this way, a wireless PDA can be used to populate a legacy database.

Yet another advantage is that the invention may be based on proven Web technologies and open source architecture.

In certain aspects, the invention eliminates the mundane, costly, and error prone task of manual data entry from handwritten or typed forms, reentry of data, validation, and proofreading, and the inherent errors that go with these processes.

The method and system of the present invention advantageously allow for secure, customized, and efficient grouping and real time transmission of data across a computer network in a more efficient manner than previously used. The customization provided by the network enables it to be used by numerous industries and for countless tasks and transactions.

As a still further advantage, the invention provides businesses with the opportunity to embrace wireless mobile devices and other new forms of technology, enhancing their hardware infrastructure, at a low cost to integrate and update the technology. Furthermore, it allows workers away from the office to connect to their business systems securely and in real time to exchange information using pervasive devices.

As still another advantage, the present invention is a time saving and pain killing method of data entry into a database or legacy system. It solves the problem of recording data due to its ease of use, facile implementation, and low cost of integration. It saves users time by allowing them to record data in real time due to its convenient, intuitive user interface and pervasive computing feature. It allows efficiency in businesses by reducing the need to send, receive, and reenter data transactions manually. Data need only be entered once, as opposed to a multitude of times (as with certain conventional data exchange systems), saving businesses time and money.

Furthermore, users do not have to be at an office PC wired to a network to input data according to the method and system of the present invention. Users can input data remotely from their offices/homes or in transit, such as in the field or at customer locations, in real time while activities on which they report are happening. The remote accessibility minimizes the amount of lost information, e.g., from transcribing handwritten notes or attempting to remember events and information to input. The method and system are simple and intuitive such that users do not have to overcome a huge learning curve for integration of the method and system. Also, the method and system can be customized for the target user to further simplify and reduce barriers to learning and successful operation.

The universal connectability of the present invention is capable of linking applications internally within a company, allowing integration of key internal systems. It allows users to keep their existing legacy systems, preserving their large capital investments, and at the same time, providing them with a cost effective opportunity to embrace new technologies, such as pervasive computing or possibly XML, without losing compatibility with legacy systems. Companies can enhance their existing systems with customized applications at a low integration cost.

Using the ASP of the present invention provides users with a continual upgrade path of hardware infrastructure as the hardware infrastructure used in hosting the software is upgraded and maintained by the ASP. The pervasive computing environment of the present invention has robust functionality because the scripts may be server-based; they do not need to reside on the handheld device. Accordingly, the system is not constrained by the handheld's limitations, such as a small memory size, slower processor, etc.

The ASP of the present invention enables users to have customized forms and applications, e.g., pages or portals. An agent, such as an e-mail agent or zotbot, can create the customized forms or applications automatically for the system. For example, each portal may provide a form having fields for entering data. Each data field may have a popup menu that provides options for a user to select. The popup menu may supply a default selection for a field to ensure that there is data in that field. The popup menu selections can be changed periodically, such as on a weekly basis, by use of a zotbot. The zotbot prompts the user for the desired selections for each field or for initialization information. It then generates the appropriate Perl (Mod Perl or any other suitable programming language being used) script/zotbot that creates the desired form. These scripts are small, simple to manipulate, and portable across a multitude of computing platforms.

The present invention can also be used between businesses as a business-to-business interchange. Businesses can exchange data regardless of whether the two businesses use different computing systems and have different database programs. For instance, the present invention may be used as a supply chain management application. That is a supplier may transmit information to a customer directly through the system. The information transmitted can be encrypted and validated, as described above, and the customer can incorporate that information directly into its database. In addition, it is capable of connecting disparate proprietary systems even from different companies, acting as a bridge for data exchange. It allows businesses to build closer ties to their suppliers, distributors, and customers.

E-mail agents or bots can process the messages en masse: validate the user, decrypt the message, validate the data, and load into the database. The system is flexible such that e-mail clients and encryption algorithms can be chosen from open source architecture, proprietary architecture, and combinations of these architectures.

The method and system of the present invention also provide a means by which information can be time stamped in order to verify the date on which information is generated or transmitted. The system is capable of recording a trail of time stamps in each step. The system's servers generate the times used for the time stamps. Additionally, the time of data transmission can be recorded for different users of the system, providing further corroboration of the time stamps.

The time stamping ability is especially useful for laboratories or inventors who want to record the earliest date of experimental results and/or an invention; thus, not only can sensitive data be securely entered and transmitted, it can also be time stamped. Time stamping according to the present invention is also useful for electronic documents and/or web site pages whose publication dates cannot be verified with the same ease that a newspaper or magazine article (or other document first published in paper) can.

The electronic data exchange interface of the present invention exhibits superior performance. Scripts used for the present invention that may be in Perl can be enhanced (i.e., to execute even faster) by using more powerful programming languages, such as Mod Perl; Mod Perl is a more powerful version of Perl.

While illustrated and described above with reference to certain specific embodiments, the present invention is nevertheless not intended to be limited to the details shown. Rather, the present invention is directed to a method and system for providing a secure computer network in which data can be grouped, stored, and transmitted securely in real time according to user preferences and various modifications may be made in the details within the scope and range of equivalents of the description and without departing from the spirit of the invention.

What is claimed is:

1. A computer-implemented system (19) used in conjunction with an application service provider (ASP) (21) and an existing client database, the system comprising:
   a non-transitory computer readable storage medium containing executable program code;
   a user information database (23) derived from the client database;
   a messaging and collaboration system operatively associated with the user information database;
   at least one template (29) configured to be populated by the messaging and collaboration system; and
   at least one agent operatively associated with the messaging and collaboration system for dynamically generating (25) executable web scripts independently of the existing client database and from access to the template and the user information database in response to a user request, wherein the template includes at least one data structure comprising executable code to generate the executable web scripts based on user requests and the web scripts enable the generation of dynamic webpages.

2. The system of claim 1, further comprising
   a programming module (81) for executing the web scripts, the module having subroutines for encrypting data entered by the user;
   a communications module (83) for communicating inputted data from the programming module (81) to a client mail server (49);

suitable programming for processing the inputted data independently of the programming module (81), the suitable programming including a decryption routine (87).

3. The system of claim 2, further comprising a status module (87) programmed to generate an email with status information and direct said email to one of the user and the ASP; and a payment module for generating invoices to the user in response user access to the system.

4. The system of claim 3, further comprising programming (95) to update the client database with data inputted by the user.

5. The system of claim 1, further comprising:
a programming module (81) for executing the web scripts, the module having subroutines for encrypting data entered by the user;
a communications module (83) for communicating inputted data from the programming module (81) to a client mail server (49);
suitable programming for processing the inputted data independently of the programming module (81), the suitable programming including a decryption routine (87).

6. The system of claim 1, further comprising a status module (87) programmed to generate an email with status information and direct said email to one of the user and the ASP; and a payment module for generating invoices to the user in response user access to the system.

7. The system of claim 1, further comprising programming (95) to update the client database with data inputted by the user.

8. The method of claim 1, wherein the at least one agent comprises an adaptive and dynamic instruction set.

9. The method of claim 1, wherein the ASP hosts multi-user interactive applications on a pay-as-you-go-basis.

10. The method of claim 1, wherein the ASP supports pervasive e-commerce.

11. The method of claim 1, wherein the ASP bills on a regular basis.

12. A computer-implemented method for processing information received from a user of an application, the method comprising the steps of:
providing a computer-implemented system (19) used in conjunction with an application service provider (ASP) (21) and an existing client database, the system comprising a non-transitory computer readable storage medium containing executable program code, a user information database (23) derived from the client database, a messaging and collaboration system operatively associated with the user information database, at least one template (29) configured to be populated by the messaging and collaboration system, and at least one agent operatively associated with the messaging and collaboration system for dynamically generating (25) executable web scripts independently of the existing client database and from access to the template and the user information database in response to a user request;
receiving a user-initiated request for information to be processed by the application;
displaying a dynamic webpage generated by an executable web script in response to the user-initiated request, wherein the executable web script is further generated in response to the user request based on executable code from at least one data structure included in the template; and
accessing the client information database either in response to the user-initiated request or in response to an input of data on the dynamic webpage.

13. The method according to claim 12, further comprising the steps of:
encrypting any data inputted by the user prior to transmission;
transmitting the inputted data to both the client and the ASP; and
generating a status update accessible to the user.

14. The method of claim 13, further comprising randomly changing an encryption algorithm used to encrypt the data.

15. A non-transitory computer-readable medium containing program code embodying an application program for performing a method for processing information received from a user of an application, the method comprising:
providing a computer-implemented system (19) used in conjunction with an application service provider (ASP) (21) and an existing client database, the system comprising a user information database (23) derived from the client database, a messaging and collaboration system operatively associated with the user information database, at least one template (29) configured to be populated by the messaging and collaboration system, and at least one agent operatively associated with the messaging and collaboration system for dynamically generating (25) executable web scripts independently of the existing client database and from access to the template and—the user information database in response to a user request;
receiving a user-initiated request for information to be processed by the application;
displaying a dynamic webpage generated by a web script in response to the user-initiated request, wherein the executable web script is further generated in response to the user request based on executable code from at least one data structure included in the template; and
accessing the client information database either in response to the user-initiated request or in response to an input of data on the dynamic webpage.

\* \* \* \* \*